(12) United States Patent
Nakamura

(10) Patent No.: US 7,120,870 B1
(45) Date of Patent: Oct. 10, 2006

(54) METHOD, SYSTEM, AND PROGRAM FOR PRESENTING DATA IN A LIMITED DISPLAY AREA

(75) Inventor: Lee Evan Nakamura, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,974

(22) Filed: Jan. 6, 2000

(51) Int. Cl.
G06F 15/00 (2006.01)
G06F 17/00 (2006.01)

(52) U.S. Cl. ............... 715/526; 715/508; 715/715; 707/3

(58) Field of Classification Search ........... 715/526, 715/500.1, 501.1, 711, 714, 715, 780; 345/835, 345/836, 111, 157, 163; 707/3, 104.1, 10
See application file for complete search history.

(56) References Cited

U.S. PATENT DOCUMENTS

| | | | |
|---|---|---|---|
| 5,157,768 A * | 10/1992 | Hoeber et al. ............... 345/711 |
| 5,287,448 A * | 2/1994 | Nicol et al. ................. 345/707 |
| 5,450,538 A * | 9/1995 | Glaser et al. ............... 715/508 |
| 5,546,521 A * | 8/1996 | Martinez ..................... 345/711 |
| 5,572,233 A * | 11/1996 | Kakegawa .................. 345/835 |
| 5,748,931 A * | 5/1998 | Jones et al. ........................ 1/1 |
| 5,825,361 A * | 10/1998 | Rubin et al. ................ 345/839 |
| 5,859,637 A | 1/1999 | Tidwell, II |
| 5,874,953 A | 2/1999 | Webster et al. |
| 5,892,512 A | 4/1999 | Donnelly et al. |
| 5,905,493 A | 5/1999 | Belzer et al. |
| 5,923,325 A * | 7/1999 | Barber et al. ............... 345/711 |
| 6,020,828 A * | 2/2000 | Gotou ....................... 340/7.56 |
| 6,073,136 A * | 6/2000 | Bertram et al. ........... 707/104.1 |
| 6,141,659 A * | 10/2000 | Barker et al. ............... 707/102 |
| 6,275,229 B1 * | 8/2001 | Weiner et al. .............. 345/764 |
| 6,275,829 B1 * | 8/2001 | Angiulo et al. .......... 707/104.1 |
| 6,300,950 B1 * | 10/2001 | Clark et al. ................. 715/705 |
| 6,339,780 B1 * | 1/2002 | Shell et al. ................. 715/526 |
| 6,369,820 B1 * | 4/2002 | Bertram et al. ............ 345/440 |
| 6,424,362 B1 * | 7/2002 | Bornstein et al. .......... 345/854 |
| 6,437,800 B1 * | 8/2002 | Malamud et al. .......... 345/711 |
| 6,441,836 B1 * | 8/2002 | Takasu et al. .............. 345/835 |
| 6,483,526 B1 * | 11/2002 | Merrick ...................... 715/780 |
| 6,519,616 B1 * | 2/2003 | Zamora-McKelvy et al. ...................... 715/501.1 |
| 6,529,217 B1 * | 3/2003 | Maguire et al. ............ 345/769 |
| 6,570,597 B1 * | 5/2003 | Seki et al. .................. 345/835 |
| 6,593,944 B1 * | 7/2003 | Nicolas et al. ............. 345/744 |

OTHER PUBLICATIONS

Netscape Communicator 4.51, Netscape Communications Corporation, 1999.
Ntl digitalplus user guide, Sep. 2000, pp. 18, 19, 26, 27.

* cited by examiner

Primary Examiner—William Bashore
Assistant Examiner—Maikhanh Nguyen
(74) Attorney, Agent, or Firm—Janaki K. Davda; Konrad Raynes & Victor LLP

(57) ABSTRACT

Disclosed is a system, method, and program for displaying data on a display monitor under control of a computer. A first portion of a field of data and a graphical element indicating that there is a second portion of the field of data are displayed within a display area of a page, such as an HTML page. The page is enabled to selectively present the first and second portions of the field of data in response to user input.

18 Claims, 4 Drawing Sheets

METHOD, SYSTEM, AND PROGRAM FOR PRESENTING DATA IN A LIMITED DISPLAY AREA

BACKGROUND OF THE INVENTION

1. Field of the Invention

The present invention relates to a method, system, and program for presenting data in a limited display area and, in particular displaying only a portion of the data for a field of data and a graphical element indicating that there is a second portion of the displayed data which may be displayed in response to user input.

2. Description of the Related Art

In the prior art, many programs and Internet web sites display information using hover text to conserve screen display real estate. One prior art use of hover text in application programs is to display information on a control button or icon. FIG. 1 illustrates a use of hover text 2 to display information on the operation of the "Reload" button. This information is static information provided for particular icons and control buttons on the page. Another prior art use of hover text is to display the entire content in a display area if the display area is not large enough to display all the content. Typically, the display area crops the content to display only that part of the content that fits into the display area. If a user moves a mouse over the display area, then the display area will display in a hover text box the entire content of the display area. The use of hover text is implemented in standard page description languages such as the Hypertext Markup Language (HTML). HTML provides an alternate text command that allows the display of text over an image. Details of HTML are described in the publication "HTML 4.0 Specification," W3C Recommendation, revised Apr. 24, 1998 (Copyright World Wide Web Consortium 1998), which publication is incorporated herein by reference in its entirety.

Another prior art example of the use of hover text is in the Microsoft Windows NT and 95/98** operating systems. These operating systems display a task bar that displays buttons for each open application that includes the application title. If the title would extend beyond the width of the application button, then the operating system displays the application title truncated to fit into the button. If the user passes a graphical pointer over the displayed application button, then the entire application title will be displayed in hover text over the application button.

Although the above uses of hover text to display data in fixed length content areas are well known, it would be desirable to utilize the hover text feature to further improve displaying of data in fixed length content areas.

SUMMARY OF THE PREFERRED EMBODIMENTS

Preferred embodiments disclose a system, method, and program for displaying data on a display monitor under control of a computer. A first portion of a field of data and a graphical element indicating that there is a second portion of the field of data are displayed within a display area of a page. The page is enabled to selectively present the first and second portions of the field of data in response to user input.

In further embodiments, presenting the first and second portions of the field of data comprises displaying the first and second portions in response to the user input. In such case, selectively presenting the first and second portions comprises displaying the first and second portions as hover text superimposed over the display area displaying the first portion of the field of the data.

In further embodiments, a user request including search criteria is received. A database is then queried on the search criteria to access data records satisfying the search criteria. Each accessed data record includes the field of data and there is a display area for each record. The at least first portion of the field of data from each accessed data record is displayed in the display area for each record and the page is enabled to selectively present the first and second portion of the field for the record in response to user input.

The term "user input" as used herein refers to any method by which the user sends information to the computer, including clicking a mouse button, moving the mouse to move a displayed pointer to different location on the display screen, moving a pent stylus, depressing a touch screen, etc.

Preferred embodiments provide a mechanism for displaying a portion of a field of data when displaying database records. The display mechanism includes the use of a graphical element indicating further information than displayed in the display area and encoding the page to enable a user to display the entire portion of the field in response to user input. In this way, preferred embodiments conserve screen real estate by displaying only a portion of the data in a field when displaying records, yet providing a mechanism to display the entire field of data should the user want to view all the data.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 1:
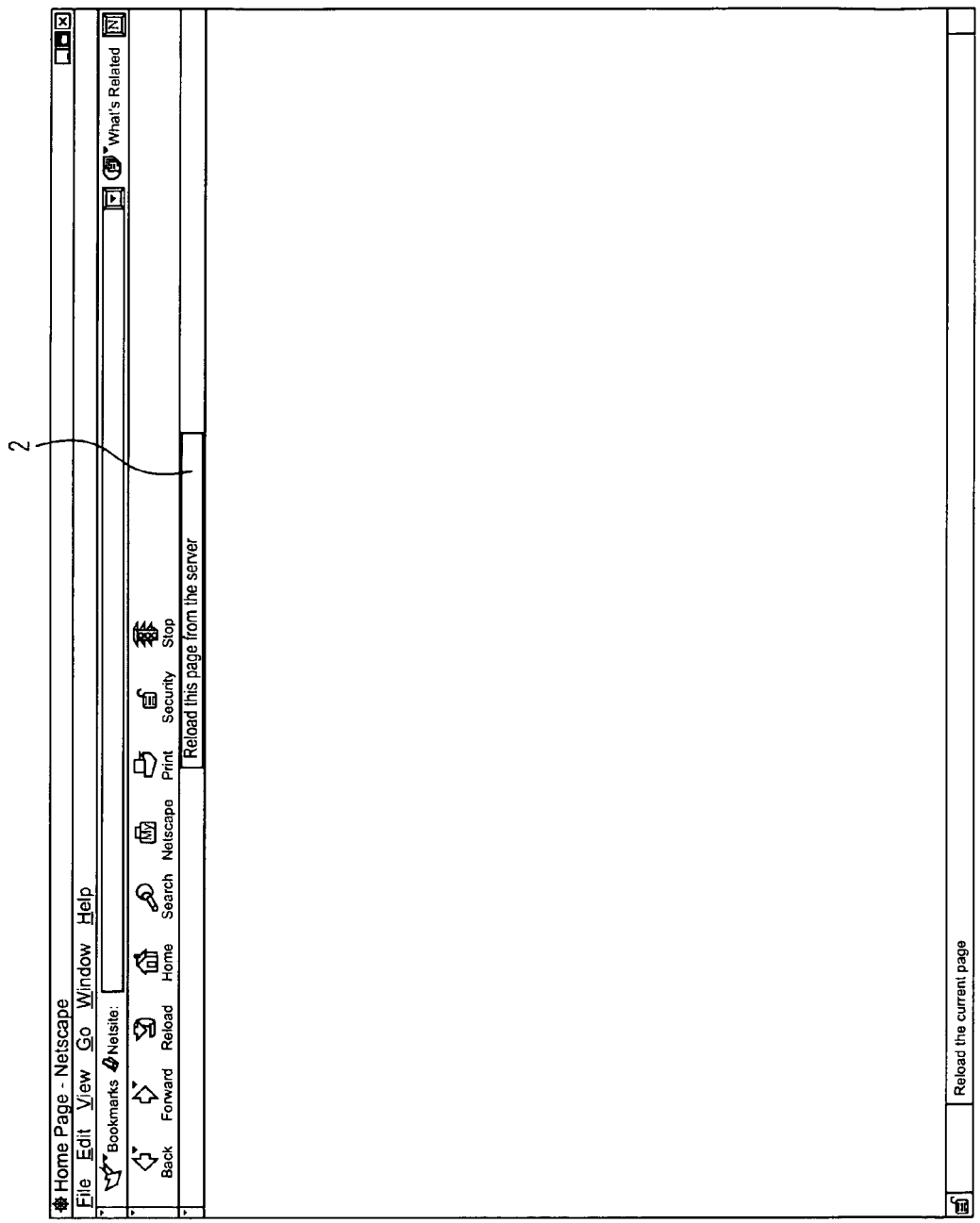
FIG. 1 illustrates an HTML page displaying hover text in a manner known in the art.
Figure 2:
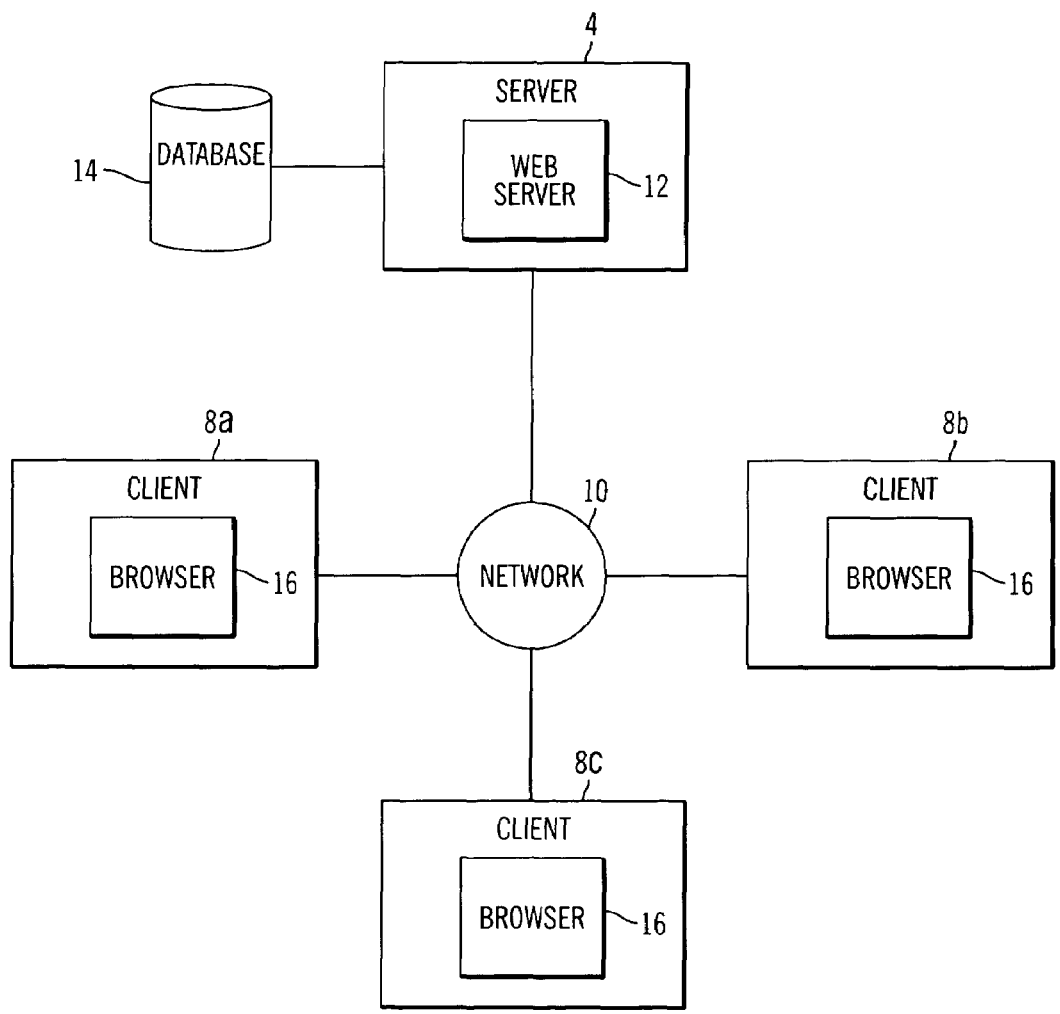
FIG. 2 illustrates a computing environment in which preferred embodiments in accordance with the present invention are implemented.

FIG. 2 illustrates a hardware and software environment in which preferred embodiments are implemented. A computing environment comprises a server 4, client computers 8a, b, c, and a network 10 providing communication therebetween. The server 4 may be any server device known in the art capable of servicing network requests, e.g., IBM NETFINITY, AS/400, and RS/6000; and POWEREDGE from Dell Computer Corporation.** The clients 8a, b, c may be comprised of any computing device known in the art that is capable of accessing and retrieving information from a network. In preferred embodiments, the server 4 includes a web server program 12 that utilizes the Hypertext Transfer Protocol (HTTP) program 12 to service HTTP requests from the clients 8a, b, c. The web server 12 may also include software to handle document requests in data transfer protocols other than HTTP, such FTP, Gopher, WAIS, NNTP, SMTP, etc.

A database 14 includes records of content to provide to the web server 12 to return to users in response to requests for information from a user at a client 8a, b, c. The database may be comprised of any database program known in the art, e.g., DB2, Oracle Corporation's ORACLE 8, Microsoft SQL Server, etc. The database 14 may include information in any text or media format known in the art, including text, images, sound files, movies, Java applets, etc. The web server 12 would build an HTML page to include information from the data base. The pages could include information in any format, including text and/or embedded audio, video images, still images, animation, three-dimensional images, etc. In preferred embodiments, the web server 12 includes the program components to retrieve data from the database 14, such as web gateway server or CGI application. This would allow the web server 12 to convert a user request for information into a query of the database 14 to retrieve database records and include the ability to encode a page in a format such as HTML, XML, etc., with the information in the database records to return to the client 8a, b or c. The web server 12 may be implemented in a web server program, such as the IBM WebSphere Application Server, which processes requests from user systems, generates queries and generates output to respond to a client request. The web server 12 may be implemented in numerous program components, such as JAVA servlets, beans, etc., to generate a response to a client request.

The clients 8a, b, c include one or more browser programs 16 that are capable of submitting document requests to the server 4. In preferred embodiments, the browser program 16 is a Hypertext Markup-Language (HTML) browsers, e.g., NETSCAPE Communicator, the MICROSOFT Internet Explorer, Spry Mosaic, NCSA Mosaic, Lynx, Opera, GNUscape Navigator, etc., that includes HTTP software to function as an HTTP client to transfer document requests to the server 4. The HTTP server protocol is described in "Hypertext Transfer Protocol—HTTP/1.1," Network Working Group, Request for Comments No. 2068 (January, 1997), which publication is incorporated herein by reference in its entirety. The browser program 16 may also include plug-ins or additional program features to process files in other media formats, such as sound files, movie files, JAVA™ applets, etc.

The network 10 may be a TCP/IP network, such as the Internet and World Wide Web, or any other network system known in the art, e.g., LAN, Ethernet, WAN, System Area Network (SAN), Token Ring, LocalTalk, etc. Alternatively, there may be separate and different networks between the server 4 and clients 8a, b, c.

Figure 3:
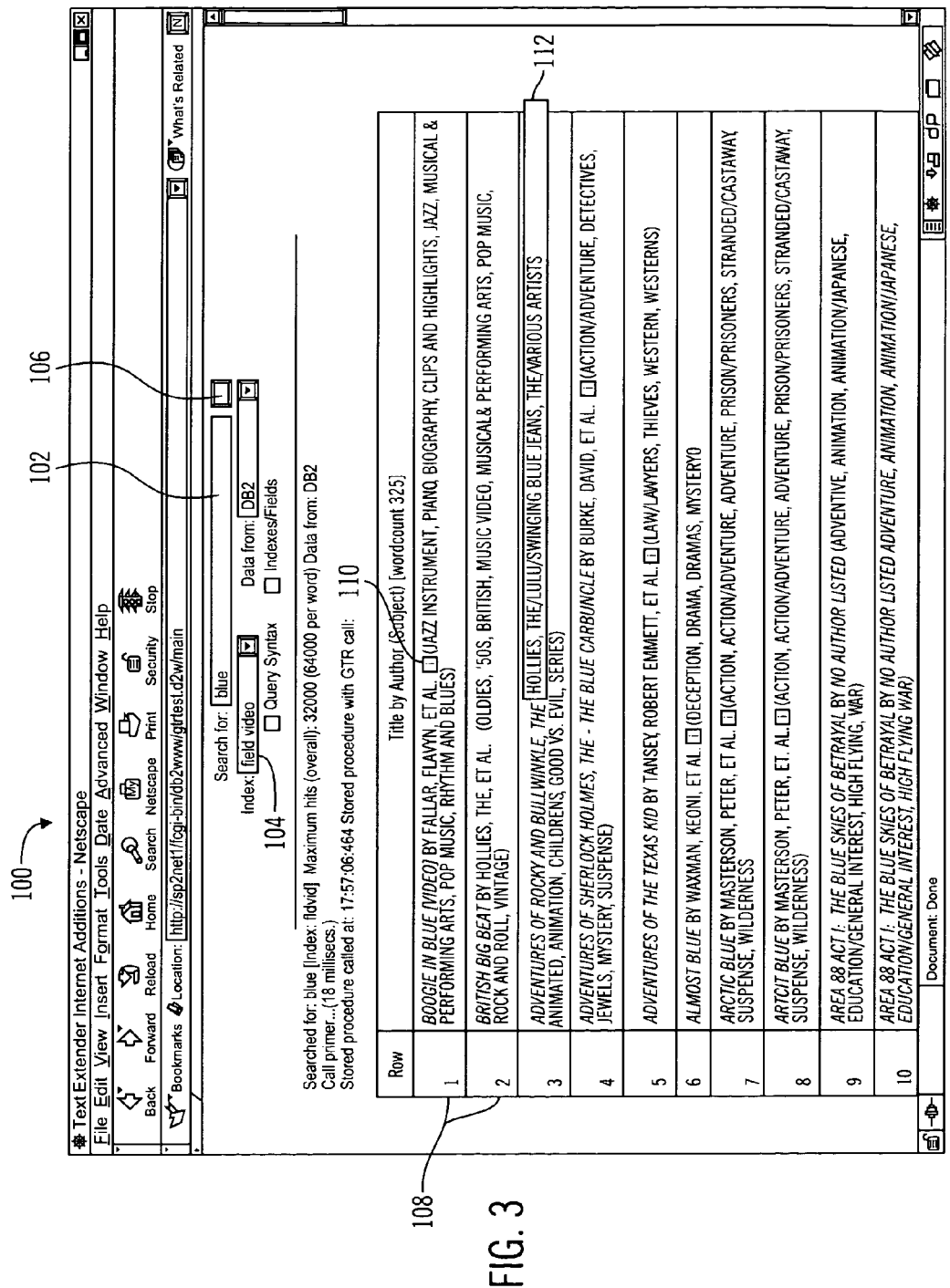
FIG. 3 illustrates an HTML page displaying database records in accordance with preferred embodiments of the present invention.

FIG. 3 illustrates an example of how preferred embodiments display information on a page. In this example, the database 14 includes one or more tables of information on music videos, including fields for the title of the video, authors, and a description of the type of video, e.g., jazz instrument, biography, children, etc. With respect to FIG. 3, a web page 100 includes a search field 102 into which the user enters a search value and other search parameters through a drop down list 104. Upon the user selecting the "GO" button 106, an HTTP request to the server 4 would be transmitted over the network 10. In response, the web server 12 would generate an HTML page 100 including the records of the results displayed in fixed size content boxes 108. The content boxes may remain fixed relative to the size of the window. Thus, as the window is resized, the content boxes may be similarly resized. The web server 12 generates the HTML code to display in each content box the video name, the authors, i.e., artists, followed by a category description of the video. If there is more than one artist, then the web server 12 generates HTML code to display the first artist, followed by "et al." and a graphical element "i" 110 indicating that there are further authors. If the user passes a mouse or other input device over the displayed "i", then the web page 100 would display in a hover text box, e.g., box 112, the names of all the authors or artists. In further embodiments, if the complete author information cannot fit into the hover text box, then such information would be truncated in the hover text box. Notwithstanding, the hover text box would display substantially more information than displayed in the content boxes 108.

Preferred embodiments provide a mechanism for using the alternate text or hover text feature of HTML to allow for only the display of the first author name and the full list of authors in a hover text box if the user passes the input device over the "i" graphical element. This conserves real estate by only displaying the first author of the list of authors in the fixed display area for each record. The user can then cause the full list of authors to be displayed.

Figure 4:
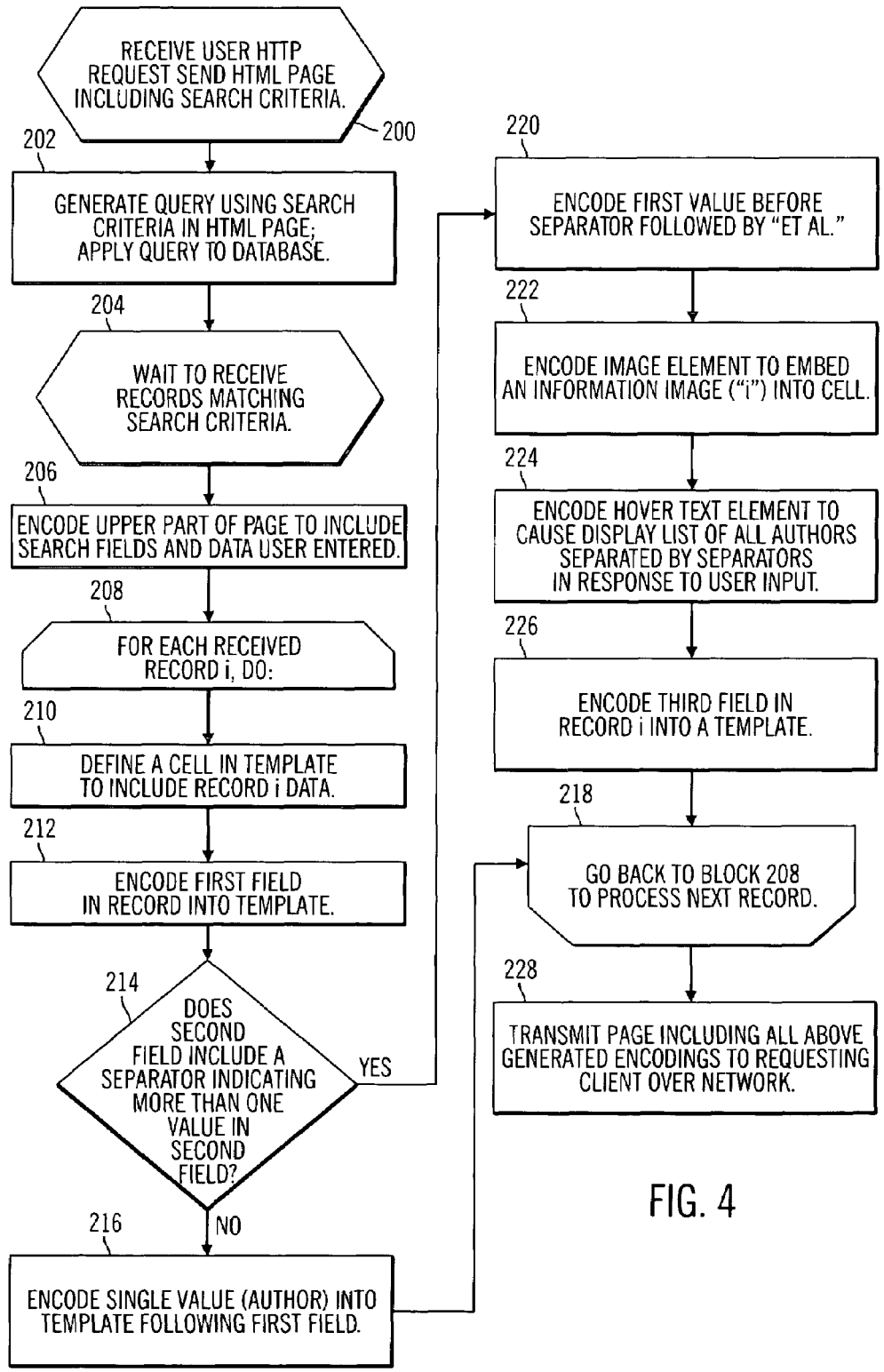
FIG. 4 illustrates logic implemented in the web server to generate HTML pages of database records in accordance with preferred embodiments of the present invention.

FIG. 4 illustrates logic implemented in the web server 12 program or components thereof to generate an output page, e.g., HTML, XML, etc., in response to a client HTTP request for data from the database 14. Control begins at block 200 with the web server 12 receiving a user HTTP request and accompanying HTML page including search criteria. The web server 12 generates (at block 202) a query using the search criteria included in the HTML page and applies the query against the database 14. Upon receiving the records matching the query (at block 204), the web server 12 encodes (at block 206) in HTML the upper part of the HTML page 100 to include the search criteria provided by the user, as shown in FIG. 3. For each received record i, the web server 12 begins a loop at block 208 to generate information from the record into each display box 108. First the web server 12 defines (at block 210) in HTML code a cell in the template to include record i data. The web server 12 may use the HTML "TD" element to define a table cell to include the data from record. The web server 12 then encodes (at block 212) the first field in the record i into the HTML template. In the example of FIG. 3, the first data in each record box 108 is the name of the video.

The web server 12 then determines (at block 214) whether the second field includes a separator indicating multiple values for that field. If only one value is included for the field, e.g., such as one author, then the web server 12 encodes (at block 216) the single value into the template 100 following the first field. Control then proceeds (at block 118) back to block 208 to process the next returned record. If the second field included a separator and more than one value, e.g., multiple authors, then the web server 12 encodes (at block 220) the first value before the first separator into the display box followed by "et al". The web server 12 then encodes (at bock 222) an image element to embed an information symbol into the cell, shown as "i" 110 in display box 108 FIG. 3. The information symbol "i" denotes that there is further information on the authors not displayed in the box 108. The web server 12 then encodes (at block 224) a hover text element following the information symbol "i" to include the capability to display the full list of authors in hover text above the box, as shown as 112 in FIG. 3, when the user passes an input device, such as a mouse pointer, over the hover text element following the information symbol "i".

In preferred embodiments, the hover text capability would be encoded using the HTML alternate text "alt" attribute definition. After adding the hover text capability to the display box 108, the web server 12 proceeds to block 226 to encode the data from the third field into the template 100. The web server 12 encodes (at block 226) the data in the third field into the template following the second field. In FIG. 3 the third field is categorical information on the video. After inputting data from all the returned records in the HTML page 100, the web server 12 transmits the generated page to the client 8*a*, *b*, or *c* over the network 10.

Preferred embodiments use the hover text to display an entire field of data when only a portion thereof is displayed in the display area for the data to conserve screen real estate. Thus, for every information symbol "i" included in a display box, different content, e.g., lists of authors, is presented in hover text to allow the user to selectively view all the data in the field. In this way, the information symbol "i" is a placeholder for information to indicate that further information is available although not currently displayed to conserve screen real estate. Thus, preferred embodiments are particularly useful for displaying lengthy fields in database records when a fixed size display area is used to display each record.

Alternative Embodiments and Conclusions

This concludes the description of the preferred embodiments of the invention. The following describes some alternative embodiments for accomplishing the present invention. The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

Preferred embodiments were described with respect to the HTTP protocol for transmitting documents between computers within a network. However, those skilled in the art will appreciate that the preferred embodiments may apply to any communication protocol for allowing a client to request and access files in a network environment. Preferred embodiments were described with respect to using the alternate text attribute of HTML to display the entire content of a field when multiple values are present in the field. In alternative embodiments, the hover text may be used to display the content of a particularly lengthy field even if the field only includes one value. Preferred embodiments were described with respect to using the hover text to display information in database records. However, the preferred use of a placeholder (e.g., information symbol "i") and then the alternative hover text option may be used to display data from any location, not just database records.

Preferred embodiments were described with respect to presenting information in pages conforming to the HTML file format. However, alternative file formats for building implementing the web pages and hover text may be used, such as Dynamic Hypertext Mark-Up Language (DHTML), the Extensible Markup Language (XML), Cascading Sytle Sheets, any other Standard Generalized Markup Language (SGML), or any other language known in the art for creating interchangeable, structured documents. Further, any version of HTML may be used, including version 2.0, 3.2, 4.0, etc. In yet further embodiments, the requested file may be in any other file format, i.e., other than an SGML type format, capable of being displayed or otherwise executed by the requesting client.

Preferred embodiments were used to display text using an expanded format such as hover text if the data to display would not fit into the display area. In alternative embodiments, the additional information from the data to display may be presented through media other than displayed hover text. For instance, the additional values in the field may be presented through a computer voice, displayed in an animation program, etc. Preferred embodiments were described with respect to a network environment in which pages are provided to a client from a server over a network, such as the Internet. However, in alternative embodiments the interlinking pages may be maintained within and used by a single computing device, such as a computer with a hard disk drive.

In summary, the present invention provides a system, method, and program for displaying data on a display monitor under control of a computer. A first portion of a field of data and a graphical element indicating that there is a second portion of the field of data are displayed within a display area of a page. The page is enabled to selectively present the first and second portions of the field of data in response to user input. The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

\*\*NETSCAPE is a registered trademark of the Netscape Communications Corporation; WINDOWS, WINDOWS NT, and MICROSOFT are registered trademarks and Microsoft SQL Server is a trademark of Microsoft Corporation; DB2, OS/2, NETFINITY, AS/400, and RS/6000 are registered trademarks of International Business Machines Corporation; JAVA is a trademark of Sun Microsystems, Inc; POWEREDGE is a registered trademark of the Dell Computer Corporation; of Microsoft Corporation; DB2, AIX, OS/390, OS/400, and OS/2 are registered trademarks of IBM; and Oracle8 is a trademark of Oracle Corporation.

What is claimed is:

1. A method for displaying data on a display monitor under control of a computer, comprising:
    receiving a user request including a search criteria;
    querying a database on the search criteria to access data records satisfying the search criteria, wherein each accessed data record includes the field of data, wherein there is a display area for each record;
    retrieving one or more records matching the search criteria, wherein each record includes at least one field of data; and
    when a field of data includes a separator indicating that there are multiple values for the field, displaying in a page a first portion of the field of data and a graphical element indicating that there is a second portion of the field of data within a display area of the page, further comprising displaying in the display area for each record the at least first portion of the field of data from each accessed data record, wherein the page is enabled to selectively present the first and second portion of the field for the record in response to user input; and enabling the page to selectively present the first and second portions of the field of data in response to user input passing over the graphical element, wherein displaying the first portion in the display area comprises displaying a first value in the data field, and wherein presenting the first and second portions in response to user input comprise displaying all the values from the data field.

2. The method of claim 1, wherein presenting the first and second portions of the field of data comprises displaying the first and second portions in response to the user input.

3. The method of claim 2, wherein selectively presenting the first and second portions comprises displaying the first and second portions as hover text superimposed over the display area displaying the first portion of the field of the data.

4. The method of claim 1, wherein the page is an HTML page and wherein an HTML alternative text attribute element is used to enable the page to selectively present the first and second portions of the field of data in response to user input.

5. The method of claim 1, further comprising displaying at least one additional field of data in each display area for each accessed record.

6. The method of claim 1, wherein the first and second portions are presented in response to user input indicating movement of a graphical pointer over the displayed graphical element.

7. A system for displaying data, comprising:
a computer;
a display monitor under control of the computer;
means for receiving a user request including a search criteria;
means for querying a database on the search criteria to access data records satisfying the search criteria, wherein each accessed data record includes the field of data, wherein there is a display area for each record;
means for retrieving one or more records matching the search criteria, wherein each record includes at least one field of data; and
when a field of data includes a separator indicating that there are multiple values for the field,
means for displaying in a page on the display monitor a first portion of the field of data and a graphical element indicating that there is a second portion of the field of data within a display area of the page, further comprising means for displaying in the display area for each record the at least first portion of the field of data from each accessed data record, wherein the page is enabled to selectively present the first and second portion of the field for the record in response to user input; and
means for enabling the page to selectively display on the monitor the first and second portions of the field of data in response to user input passing over the graphical element wherein the means for displaying the first portion in the display area comprises displaying a first value in the data field, and wherein presenting the first and second portions in response to user input comprise displaying all the values from the data field.

8. The system of claim 7, wherein the means for displaying the first and second portions of the field of data comprises displaying the first and second portions in response to the user input.

9. The system of claim 8, wherein the means for selectively displaying the first and second portions comprises displaying the first and second portions as hover text superimposed over the display area displaying the first portion of the field of the data.

10. The system of claim 7, wherein the page is an HTML page and wherein an HTML alternative text attribute element is used to enable the page to selectively present the first and second portions of the field of data in response to user input.

11. The system of claim 7, further comprising displaying at least one additional field of data in each display area for each accessed record.

12. The system of claim 7, wherein the first and second portions are displayed in response to user input indicating movement of a graphical pointer over the displayed graphical element.

13. An article of manufacture for displaying data on a display monitor under control of a computer, the article of manufacture comprising a computer readable storage medium including at least one computer program embedded therein that is capable of causing the computer to perform:
receiving a user request including the search criteria;
querying a database on the search criteria to access data records satisfying the search criteria, wherein each accessed data record includes the field of data, wherein there is a display area for each record;
retrieving one or more records matching the search criteria, wherein each record includes at least one field of data;
when a field of data includes a separator indicating that there are multiple values for the field,
displaying in a page a first portion of the field of data and a graphical element indicating that there is a second portion of the field of data within a display area of the page, further comprising displaying in the display area for each record the at least first portion of the field of data from each accessed data record, wherein the page is enabled to selectively present the first and second portion of the field for the record in response to user input; and
enabling the page to selectively present the first and second portions of the field of data in response to user input passing over the graphical element, wherein displaying the first portion in the display area comprises displaying a first value in the data field, and wherein presenting the first and second portions in response to user input comprise displaying all the values from the data field.

14. The article of manufacture of claim 13, wherein presenting the first and second portions of the field of data comprises displaying the first and second portions in response to the user input.

15. The article of manufacture of claim 14, wherein selectively presenting the first and second portions comprises displaying the first and second portions as hover text superimposed over the display area displaying the first portion of the field of the data.

16. The article of manufacture of claim 13, wherein the page is an HTML page and wherein an HTML alternative text attribute element is used to enable the page to selectively present the first and second portions of the field of data in response to user input.

17. The article of manufacture of claim 13, further comprising displaying at least one additional field of data in each display area for each accessed record.

18. The article of manufacture of claim 13, wherein the first and second portions are presented in response to user input indicating movement of a graphical pointer over the displayed graphical element.

* * * * *